(12) United States Patent
Byelashov et al.

(10) Patent No.: US 12,059,012 B2
(45) Date of Patent: *Aug. 13, 2024

(54) AQUEOUS HOP PRODUCTS AND PROCESSES FOR IMPARTING FLAVOR AND AROMA TO BEVERAGES

(71) Applicant: John I. Haas, Inc., Yakima, WA (US)

(72) Inventors: Oleksandr Byelashov, Yakima, WA (US); Victor Alexander Algazzali, Williston, VT (US); Phillip Kim Chou, Selah, WA (US); Michael Visgil, Yakima, WA (US); Brian Patrick Buffin, Yakima, WA (US)

(73) Assignee: JOHN I. HAAS, INC., Yakima, WA (US)

( * ) Notice: Subject to any disclaimer, the term of this patent is extended or adjusted under 35 U.S.C. 154(b) by 387 days.

This patent is subject to a terminal disclaimer.

(21) Appl. No.: 16/907,821

(22) Filed: Jun. 22, 2020

(65) Prior Publication Data

US 2020/0397029 A1 Dec. 24, 2020

Related U.S. Application Data

(60) Provisional application No. 62/864,942, filed on Jun. 21, 2019.

(51) Int. Cl.
*A23L 27/10* (2016.01)
*A23L 2/56* (2006.01)
(Continued)

(52) U.S. Cl.
CPC ............... *A23L 27/11* (2016.08); *A23L 2/56* (2013.01); *C12C 3/06* (2013.01); *C12C 3/10* (2013.01);
(Continued)

(58) Field of Classification Search
CPC ..... A23L 2/56; A23L 27/11; C12C 3/10; C12C 5/026; C12C 3/06; C12G 3/06
See application file for complete search history.

(56) References Cited

U.S. PATENT DOCUMENTS 3,979,527 A † 9/1976 Laws
4,995,945 A † 2/1991 Craig
(Continued)

OTHER PUBLICATIONS

Hughes, P.S., Simpson, W.J. Production and composition of hop products. *Tech Q Master Brew Assoc Am*, 1993; 30: 146-154.
(Continued)

*Primary Examiner* — Vera Stulii
(74) *Attorney, Agent, or Firm* — Morgan, Lewis & Bockius LLP; Jeffry S. Mann

(57) ABSTRACT

The present invention relates to natural aqueous essence compositions comprised of flavor and aroma constituents from hops. The invention also relates to methods for adding flavor and aroma to beers, ciders, meads, or other fermented beverages, as well as other alcoholic and non-alcoholic beverages such as seltzers, flavored waters, and teas where a hop-derived flavor and aroma is desired. The aqueous essence compositions are comprised of compounds that are naturally present in hops or in beer and/or result from processes that occur during brewing or in the aqueous processing of hop cones, hop pellets, or other solids separated from the hop plant (*Humulus lupulus*). The present invention also relates to the process by which aroma and flavor components are released and isolated from hops in a process that involves steam stripping, concentration, and collection of valuable aroma- and flavor-active hop constituents.

36 Claims, 6 Drawing Sheets

(51) Int. Cl.
    *C12C 3/06*    (2006.01)
    *C12C 3/10*    (2006.01)
    *C12C 5/02*    (2006.01)
    *C12G 3/06*    (2006.01)
(52) U.S. Cl.
    CPC ............... *C12C 5/026* (2013.01); *C12G 3/06* (2013.01); *A23V 2002/00* (2013.01)

(56) References Cited

U.S. PATENT DOCUMENTS

| | | | |
|---|---|---|---|
| 2003/0138546 | A1† | 7/2003 | Goldstein |
| 2007/0077343 | A1† | 4/2007 | Ma |
| 2007/0254063 | A1† | 11/2007 | Aerts |
| 2018/0291318 | A1† | 10/2018 | Byelashov |
| 2020/0172842 | A1† | 6/2020 | Wu, Jr. |

OTHER PUBLICATIONS

International Search Report and Written Opinion from International Patent Application PCT/US2020/038936, mailed Sep. 14, 2020 (7 pages).
Moir, M., "Hops—A Millennium Review", J. Am. Soc. Brew. Chem., 2000, 58(4), 131-146.
Sharp, D. C.; Qian, Y.; Shellhammer, G.; Shellhammer, T. H., "Contributions of Select Hopping Regimes to the Terpenoid Content and Hop Aroma Profile of Ale and Lager Beers", J. Am. Soc. Brew. Chem., 2017, 75(2), 93-100.
Sharp, D. C.; Vollmer, D. M.; Qian, Y.; Shellhammer, T. H., "Examination of Glycoside Hydrolysis Methods for the Determination of Terpenyl Glycoside Contents of Different Hop Cultivars", J. Am. Soc. Brew. Chem., 2017, 75(2), 101-108.
Ting, P.; Ryder, D. S., "The Bitter Twisted Truth of the Hop: 50 Years of Hop Chemistry", J. Am. Soc. Brew. Chem., 2017, 75(3), 161-180.
Van Opstaele, F.; De Rouck, G.; De Clippeleer, J.; Aerts, G.; De Cooman, L., "Analytical and Sensory Assessment of Hoppy Aroma and Bitterness of Conventionally Hopped and Advanced Hopped Pilsner Beers", J. Inst. Brew., 2010, 116(4), 445-458.
Vollmer, D. M.; Shellhammer, T. H., "Influence of Hop Oil Content and Composition on Hop Aroma Intensity in Dry-Hopped Beer", J. Am. Soc. Brew. Chem., 2016, 74(4), 242-249.
Anonymous: "Synergy Flavors Launches Hop Essences—BevNET. corn", Essences—BevNET. corn, Jun. 5, 2019 (Jun. 5, 2019), XP093043894, Retrieved from the Internet: URL:https://www.bevnet.com/news/supplier-n_ews/2019/synergy-flavors-launches-hop-essences/.
Database GNPD [Online] Mintel; May 16, 2019 (May 16, 2019), anonymous: "Alcohol-Free Beer", XP093043897, Database accession No. 6556171.
Daniel C. Sharp et al., "Examination of Glycoside Hydrolysis Methods for the Determination of Terpenyl Glycoside Contents of Different Hop Cultivars", pp. 101-108, 2017, J. Am. Soc. Brew. Chem.†
M.F. Graber et al., "Spinning cone column isolation of rosemary essential oil", pp. 615-619, 2010, Food Control.†

† cited by third party

Table 3. Descriptive sensory analysis of beers produced with competing Citra® dry-hop products

| Product | OHAI | Floral | Citrus | Sweet Fruit | Green Fruit | Berry & Currant | Cream Caramel | Woody Aromatic | Menthol | Herbal | Spicy | Green-Grassy | Vegetal | Liking | Uniqueness |
|---|---|---|---|---|---|---|---|---|---|---|---|---|---|---|---|
| Pellets | 5.9 c | 4.0 a | 4.9 ab | 5.4 c | 2.6 abc | 3.0 a | 1.9 ab | 3.3 a | 1.3 a | 2.3 a | 1.8 a | 2.3 a | 1.8 a | 6.4 c | 4.6 a |
| Product B | 4.7 a | 3.3 a | 4.0 a | 3.7 ab | 3.6 c | 3.4 a | 2.3 b | 3.6 a | 1.0 a | 2.7 a | 1.6 a | 2.4 a | 2.0 a | 4.4 ab | 3.6 a |
| Essence | 5.9 c | 3.8 a | 4.7 ab | 4.3 b | 1.9 a | 3.2 a | 2.0 ab | 3.9 a | 0.7 a | 2.3 a | 1.7 a | 2.0 a | 1.8 a | 5.4 bc | 3.8 a |
| Product A | 5.6 bc | 3.6 a | 5.1 b | 4.0 ab | 3.3 bc | 2.8 a | 2.1 ab | 4.0 a | 0.8 a | 2.4 a | 1.5 a | 1.9 a | 1.6 a | 5.1 ab | 3.9 a |
| Product C | 5.1 ab | 3.4 a | 4.1 a | 3.3 a | 2.3 ab | 2.8 a | 1.2 a | 3.3 a | 1.4 a | 2.7 a | 2.0 a | 2.6 a | 2.0 a | 4.1 a | 3.8 a |
| P-Value | 0.005 | 0.859 | 0.239 | 0.003 | 0.135 | 0.902 | 0.509 | 0.723 | 0.462 | 0.945 | 0.920 | 0.745 | 0.978 | 0.026 | 0.850 |
| Significant | Yes | No | No | Yes | No | No | No | No | No | No | No | No | No | Yes | No | a-c
   *Means in a column followed by different letters are different ($P < 0.10$)*
Intensities are scored on a 10-point universal scale where 0 = none and 10 = very high

FIG. 2

Table 4. Summary of True-to-Type and Difference from Control (DFC)

(a)

| Product | True-to-Type? Yes | True-to-Type? No |
|---|---|---|
| Pellet | 12 | 2 |
| Essence | 9 | 5 |
| Product C | 7 | 7 |
| Product B | 8 | 6 |
| Product A | 9 | 5 |

(b)

| Product | Average Difference from Control (10 pt Scale) |
|---|---|
| Essence | 3.6 (Slightly Different) |
| Product C | 5 (Quite Different) |
| Product B | 5.4 (Quite Different) |
| Product A | 3.6 (Slightly Different) |

FIG. 4

Table 5. Summary of Panelist Comments

| Product | Comment Summary |
|---|---|
| Essence | Very Woody (Wet Forest and Pine), Floral and Citrus (Grapefruit) especially in mouth vs aroma, Dank |
| Pellet | (Bright) Citrusy, Tropical, Most Robust, Sweet |
| Product A | Citrus, Catty, Mango, Pine |
| Product B | Mild, Floral, Citrus, Green Apple, Light Pine |
| Product C | Fragrant Generic Floral, Musty, Woody |

FIG. 5

AQUEOUS HOP PRODUCTS AND PROCESSES FOR IMPARTING FLAVOR AND AROMA TO BEVERAGES

FIELD OF THE INVENTION

The present invention relates to compositions and methods for adding flavor and aroma to beer and other beverages. The present invention concerns the use of compositions comprising compounds that are present in hops or in beer and/or result from processes that occur during brewing or in the aqueous processing of hop cones, hop pellets, or other constituents separated from the hop plant (*Humulus lupulus*). The present invention also relates to the process by which aroma and flavor components are released and isolated from hops.

BACKGROUND OF THE INVENTION

As the craft brewing industry becomes increasingly competitive, brewers are seeking to gain efficiencies in their processes and to improve the bottom line. Pelletized hops area staple of both commercial and home brewers. However, hop extracts are increasingly used in brewing due to key advantages, including better alpha acid utilization, reduced yield losses, reduced cost of storage and shipment, and longer shelf-life. Now, recent advancements in hop extraction and fractionation are providing more convenient options to improve beer yield and maximize flavor. New pourable hop products carry all of the advantages of traditional extracts, but with better solubility in wort. They are also easier to use (i.e., no pre-heating required, pour directly from a recyclable bottle). These non-isomerized, all-hops products also offer unique possibilities for both bittering and aroma additions. The new products contain significantly higher levels of oils than traditional extracts and are designed for use throughout the brewing process.

Extraction of essential compounds from hop cones has been performed for more than a century. Traditionally, extraction relied on chemical solvents such as hexane and ethanol, but the predominant solvent choice in modern-day hop extraction is either liquid or supercritical $CO_2$. Utilizing pressurized $CO_2$ to extract hop pellets enables the efficient separation of beneficial compounds, resulting in semi-solid extracts that are typically dosed directly to the kettle. In this traditional extraction method, whole-cone hop pellets are placed in a high-pressure vessel, through which pressurized $CO_2$ is passed, acting as a solvent. This process selectively separates the resins (including alpha and beta acids) and essential oils (distinctive flavor components) from the hop pellets, while leaving behind the vegetal material (Hughes, P. S., Simpson, W. J. Production and composition of hop products. *Tech Q Master Brew Assoc Am*, 1993; 30: 146-154.).

The brewing process comprises boiling of wort, an aqueous solution of sugars that results from steeping of cereal grains in water, and then fermenting the wort with yeast.[1-3] The fermented finished product is considered beer. Hops or hop products are typically employed during the brewing process to provide bitterness to the beer and/or impart characteristic flavors including but not limited to floral, fruity, spicy, citrus, herbal, or woody.[4,5] The hop bittering acids and hop essential oils are located in the lupulin glands of hop cones found on the female plants of *Humulus lupulus*. Hops and hop products are added at various points in the brewing process depending on the desired flavor impact.

Hops are traditionally added to the wort during boiling, referred to as "hot side" addition, to promote the conversion of hop alpha acids into isoalpha acids, the primary bittering compounds in beer. Many factors, such as wort pH and length of boil time with hops, contribute to the hop alpha acid utilization and the bitterness of the beer.[4]

Hop essential oils, most often simply referred to as hop oils, are the primary contributors to the distinctive hop aroma and flavor in beers.[4] Other components present in hop plants, such as glycosides, cysteine-bound thiols, lactones, and other non-volatile precursors, have also been identified as playing an important role in the hop flavor and aroma of beer.[6] The overall character of the flavor/aroma imparted to beer is highly dependent on the variety of hops being employed and where in the brewing process the hops are added.[7-9] Hop oils are volatile and readily lost during wort boiling. Thus, brewers will often add hops for flavor and aroma late in the process of boiling or after boiling has ceased and the wort is cooling and undergoing separation of insoluble materials, often referred to as whirlpool addition. Additional hop character can be imparted to beer by adding hops or hop products directly during or after fermentation. This "cold side" addition practice is often referred to as dry hopping.

Imparting distinctive hop character to beer can be accomplished in numerous ways. Traditional means include the use of whole hops, hop pellets, or hop plugs. Supercritical $CO_2$ extracts of hops are also employed in "hot side" additions for the promotion of hop bitterness, aroma, or flavor, which depends on the variety of the hop extract and the timing of addition.

Another means of imparting hop character to beer is through the use of downstream or advanced hop products. These are often supplied to brewers as standardized solutions for more precise control of hop bitterness, aroma, and flavor. Modification to the hop acids through different means of chemical reduction is also used to provide unique characteristics to the beer, such as light-stability and foam enhancement.[4] Typically advanced hop products are added to beer after fermentation, which greatly increases their utilization and effectiveness.

Advanced products designed to impart aroma and flavor to beer post-fermentation typically contain a mixture of hop essential oils, derivatives of hop oils, or other natural flavors. These are most often offered commercially as propylene glycol (PG) or ethanol solutions at a concentration of 1-2% by mass owing to the limited solubility of the active flavor and aroma compounds.

Despite the advantages of decreased beer loss, ease of use, and control of beer consistency, many brewers avoid the use of extant advanced hop products. Reasons range from aversion to the use of solvents such as PG to artificial and unauthentic character contributed by the majority of products currently available. A need therefore exists to provide brewers with a hop-derived natural product that imparts "true-to-type" hop variety character or other desirable flavor traits to beer in a formulation that avoids the use of solvents such as PG or ethanol. Commercially available advanced hop products are based on oil-rich extracts and tend to be cloudy and/or colored, which hampers their use in clear beverage formulations such as selzers/hard selzers.

Furthermore, incorporation of commercially available advanced hop products into the manufacturing (e.g., brewing) process is complicated by the nature of these products, which tend to be viscous, or suspensions, dispersions or other form that is not readily pumpable without the use of a solvent.

OBJECTS OF THE INVENTION

It is an object of the present invention to provide aqueous compositions comprising substances from hops in order to provide brewers with an alternate natural method to add flavor and aroma to their beverages.

It is yet a further object of the invention to provide a clear, colorless, pumpable formulation of hop essence, which can be readily incorporated into a brewing process on the cold side without the use of organic solvents.

It is another object of the invention to provide a hop essence formulation which is substantially "true to type" as this term is understood in art and as determined by a sensory panel.

It is a further object of the present invention to provide a novel process for releasing and isolating flavor and aroma compounds from hops via a natural aqueous route.

SUMMARY OF THE INVENTION

The present inventors have now discovered an aqueous hop essence product that solves the shortcomings of current hop essence formulations.

In various embodiments, the invention provides a clear, colorless formulation of hop essence, derived from hops, which can be readily incorporated into a brewing process on the cold side without the use of organic solvents. In an exemplary embodiment, the formulation is readily pumpable under conditions and using equipment normally found in a brewery.

In some embodiments, the invention provides a hop-derived hop essence formulation which is substantially "true to type" as this term is understood in art and as determined by a sensory panel. See, FIG. 2-FIG. 5.

In various embodiments, there is provided a hop-derived hop essence formulation that contains a low level of oil components, e.g., the concentration of the oil hop components is lower than that of the non-oil hop components (e.g., esters, ketones).

In an exemplary embodiment, the invention provides a novel process for releasing and isolating flavor and aroma compounds from hops via a natural aqueous route. An exemplary process for producing a formulation of the invention involves steam stripping, concentration, and collection of valuable flavor- and aroma-active hop constituents.

The present invention provides hop-derived compositions which can be added at various stages of the brewing process to provide hop flavor and aroma to malt beverages. The present invention is useful to the brewing industry in that it provides compositions of compounds naturally present in hops or in beer and/or resulting from natural processing to release and concentrate these compounds from hops. Additional flavor and aroma substances can also be added to the inventive compositions to deliver further sensory effects. The added materials can be hop oil constituents, other essential oil components, or other natural flavorings. The compositions can be used to add flavor and aroma to beverages at various levels.

One aspect of the present invention involves the use of compositions comprising naturally occurring flavor and aroma substances from hops in a method to produce a beer with significantly enhanced flavor and aroma profiles.

Another aspect of the present invention is the use of compositions comprising natural substances from hops that are released and isolated via aqueous processing to produce a beer with significantly enhanced flavor and aroma profiles.

A further aspect of the present invention is the use of these unique compositions comprising hop flavor and aroma constituents at any point in the brewing process to produce a beer with significantly enhanced flavor and aroma profiles.

A further aspect of the invention relates to a beer which may be made by any of the foregoing methods.

Another aspect of the invention relates to a practical and effective process of providing compositions of flavor and aroma constituents from hops and their utilization in beers, ciders, meads, or other fermented beverages, as well as other alcoholic and non-alcoholic beverages such as seltzers, flavored waters, and teas where a hop-derived flavor and aroma is desired.

A further aspect of the invention relates to improved aqueous processes for the formation, isolation, purification, and standardization of flavor and aroma compounds from hops. FIG. 1 diagrams an exemplary process of the present invention.

In an exemplary embodiment, the invention provides a method for preparing a natural aqueous hop flavor and aroma composition, comprising the steps of:

a. milling a hop solid into water and stirring to create an aqueous slurry;
b. processing the slurry through a Spinning Cone Column (SSC) apparatus to afford an aqueous composition comprising hop flavor and aroma constituents (an essence), an aqueous concentrate, and spent solids;
c. adjusting processing parameters at step (b) to generate aqueous hop essences with desired character;
d. optionally adding a natural or hop-derived agent to the aqueous hop essences generated at step (c) to promote product homogeneity;
e. optionally blending an aqueous hop essence generated at step (b) and an aqueous hop concentrate generated at step (b) to afford an aqueous hop composition with desired character.

Other objects, advantages and embodiments of the invention will be apparent from the detailed description following.

BRIEF DESCRIPTION OF THE DRAWINGS

FIG. 2 is a descriptive sensory analysis of beers produced with competing Citra® dry-hop products. Beers brewed with a common wort stream and dosed at equivalent rates post fermentation with four liquid products. A control beer dry hopped with 0.5 pounds per barrel (Pellets) was evaluated for comparison. Fourteen members of the John I Haas Trained Sensory Panel rated the flavor characteristics of these beers using Descriptive Analysis on a 10-point scale. All samples were blinded with randomized 3-digit codes. This data was analyzed for differences between the samples using analysis of variance (ANOVA). Post-hoc analysis using Fishers Least Significant Difference (LSD) was applied to identify individual differences. The samples were found to be significantly different based on the Overall Hop Aromatic Intensity (OHAI), Sweet Fruit, and hedonic (Liking) values.

FIG. 4 is a summary of True-to-Type and Difference from Control (DFC). Panelists were provided with an industry accepted description of Citra® type hops, "Citra is often described as having characteristics of Sweet Fruits like Mango, Citrus including Lime and Grapefruit, Floral, other generic Tropical Fruits, and occasionally "Catty" and Pine," and then were asked to rate each sample as to its relationship to that definition. Nine out of Fourteen panelists found Essence and Product A to be most similar to the description. (b) Panelists were informed that the beer produced with pellets was a control beer. They were then asked to rate the remaining four samples on their overall dissimilarity to that control beer on a ten-point scale (0=identical, 1=just perceptible, 10=Very Different). Again, the beers produced with Essence and Product A were found to be least dissimilar from the pellet control beer.

FIG. 5 is a summary of panelist comments. While performing the initial descriptive analysis of the samples, panelists were given the opportunity to provide qualitative commentary regarding the organoleptic qualities of the samples in order to avoid dumping bias. This panel represents a summary of those comments, filtered based on the commonality of key words and terminology used by the panelists. Essence and Product A received comments indicating a higher degree of similarity to the Pellet control beer—comments combining citrus, sweet fruit/tropical, floral, and woody—than Products B and C.

Figure 1:
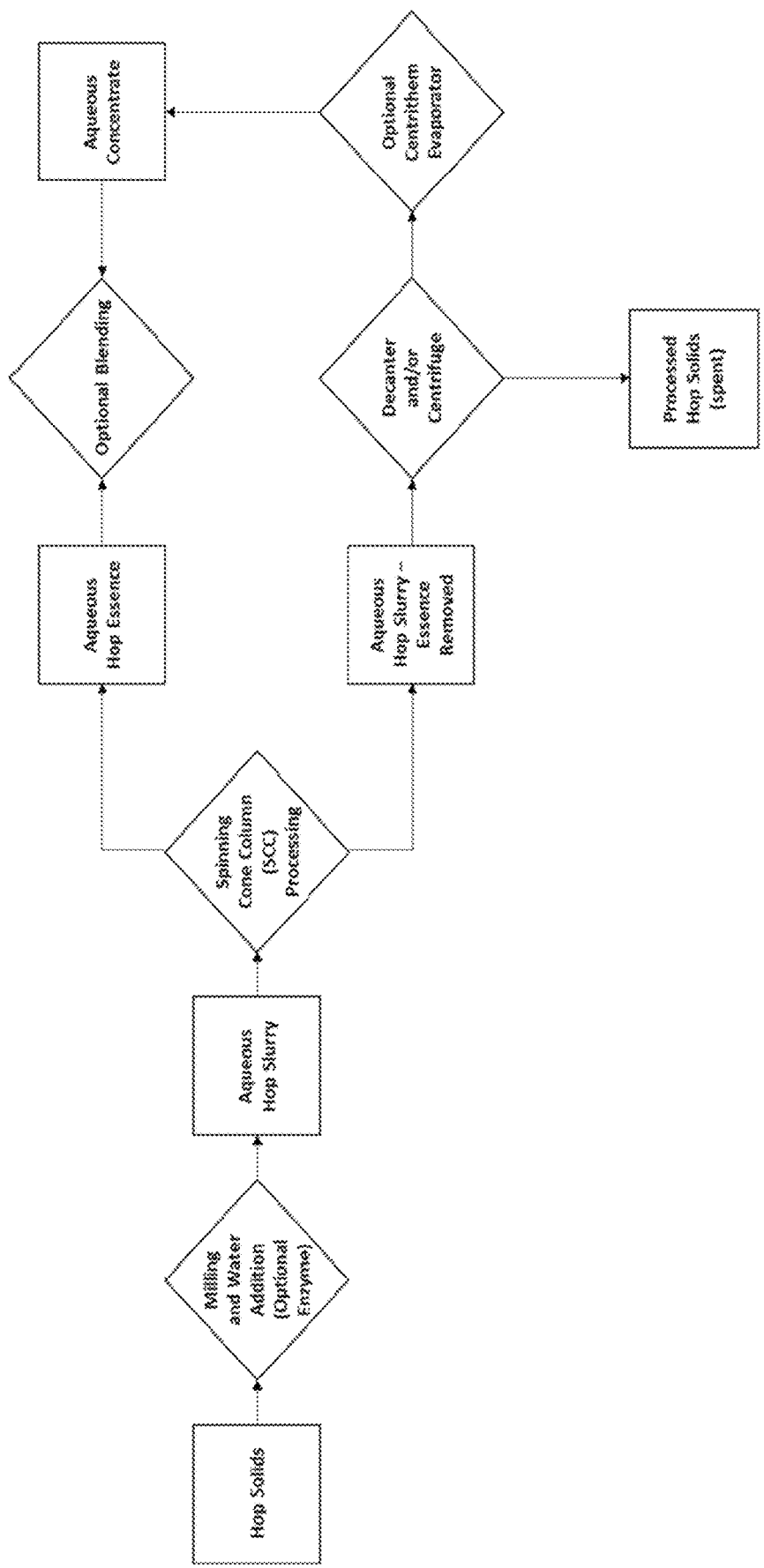
FIG. 1 diagrams an exemplary process of the invention.
Figure 3A:
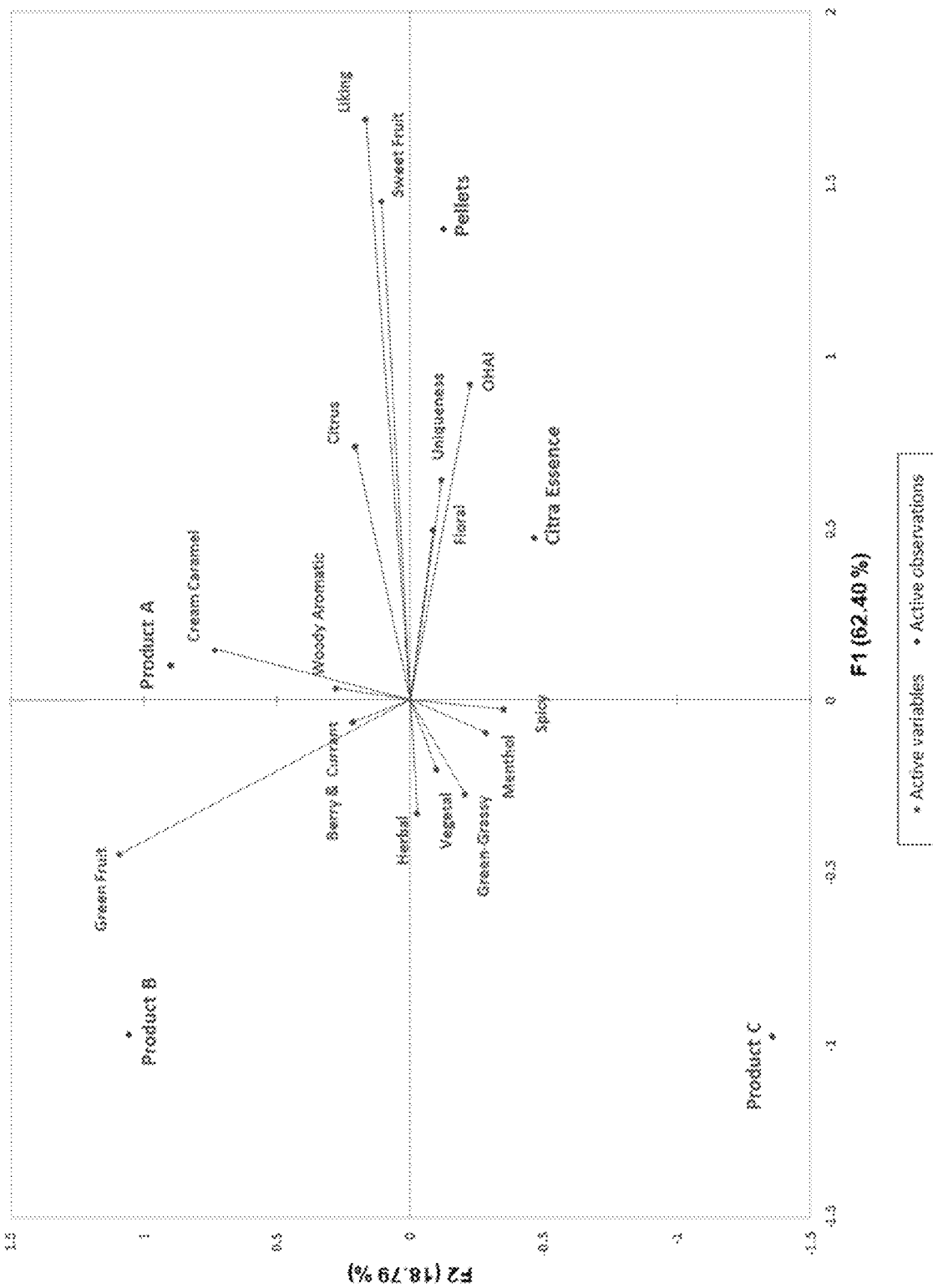
FIG. 3 is FIG. 3(a) Principal Component Analysis (PCA) biplot of Descriptive Analysis data. 81.19% of the variation between the samples is explained by the impact of each sensory attribute relative to the length and direction of the vector associated with that attribute. Samples in the same quadrant are most similar with each other, relative to their dissimilarity to the other samples.
FIG. 3(b) Confidence biplot for each samples placement on the PCA. Ellipses are produced using Bootstrap simulation (200 observations) and represent a 95% confidence interval relative to placement.
Figure 3B:
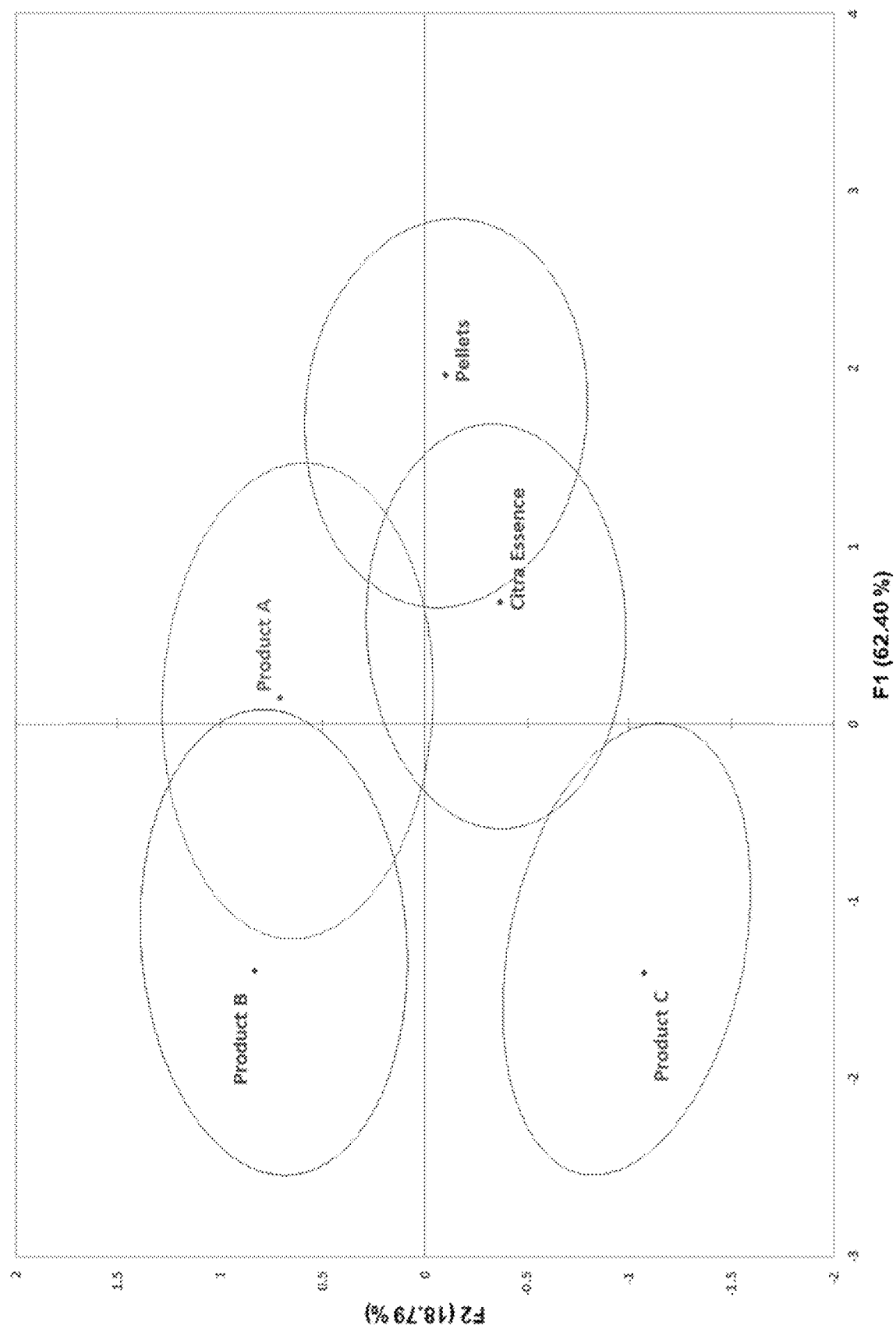

The data in FIG. 2-FIG. 5 were collected from products containing or derived from the same variety of hops.

DETAILED DESCRIPTION OF THE INVENTION

The present invention provides new aqueous compositions from hops that can be used to add flavor and aroma to beverages at various levels. The present invention is useful to the brewing industry in that it provides compositions of natural, hop-derived, hop aroma and flavor constituents as an aqueous product that is not available via extant methods.

In one embodiment of the invention, whole hop cones are ground, dispersed in water, and subsequently agitated, e.g., via mechanical stirring, to generate a slurry that contains from about 2% to about 20% of hop solids by mass (wt/wt).

In another embodiment of the invention, hop pellets, most commonly referred to as Type 90 (T-90) pellets, are ground and dispersed in water to generate a slurry that contains from about 2% to about 20% of hop solids by mass.

In an exemplary embodiment of the invention, lupulin-enriched forms of hop solids, such as Type 45 (T-45) pellets or the like, are ground and dispersed in water to generate a slurry that contains from about 2% to about 20% of hop solids by mass.

In an exemplary embodiment of the invention, hop solids that are a byproduct from the production of lupulin-enriched forms of hop products, such as supercritical $CO_2$ extracts, T-45 pellets, or the like, are ground and dispersed in water to generate a slurry that contains from about 2% to about 20% of hop solids by mass.

In a preferred embodiment of the present invention, the hop cones, hop pellets, or other hop solids are dispersed in water to generate a slurry that contains from about 4% to about 14% hop solids by mass.

In a more preferred embodiment of the present invention, the hop cones, hop pellets, and/or other hop solids are dispersed in water to generate a slurry that contains from about 5% to about 8% hop solids by mass.

In one embodiment of the present invention, the aqueous slurry of hop solids is subjected to processing with Spinning Cone Column (SCC) technology wherein parameters such as, but not limited to, SCC temperature, strip rate, offset temperature, steam temperature, feed temperature, slurry concentration, and slurry feed rate are adjusted to generate aqueous compositions comprising hop flavor and aroma constituents that can be used to impart hop flavor and aroma to beverages at various levels. Such adjustments are understood by those of skill in the art.

In an exemplary embodiment, the SCC is operated at a system temperature between about 40° C. to about 120° C., e.g., from about 40° C. to about 80° C., e.g., from about 45° C. to about 65° C.

In an exemplary embodiment, the SCC is operated with an offset temperature ($T_{SCC\ Feed}-T_{SCC}$) from about -100° C. to about 50° C., e.g., from about -50° C. to about 25° C., e.g., from about -20° C. to about 10° C.

In an exemplary embodiment, the SCC is operated with an external stripping rate of about 0.5% to about 50%, e.g., about 2% to about 30%, e.g., about 5% to about 20%.

In an exemplary embodiment of the invention, the SCC is operated at a system temperature between about 40° C. to about 120° C., with an offset temperature ($T_{SCC\ Feed}-T_{SCC}$) from about -100° C. to about 50° C., and an external stripping rate of about 0.5% to about 50%.

In a preferred embodiment of the invention, the SCC is operated at a system temperature from about 40° C. to about 80° C., with an offset temperature ($T_{SCC\ Feed}-T_{SCC}$) from about -50° C. to about 25° C., and an external stripping rate of about 2% to about 30%.

In a more preferred embodiment of the invention, the SCC is operated at a system temperature from about 45° C. to about 65° C., with an offset temperature ($T_{SCC\ Feed}-T_{SCC}$) from about -20° C. to about 10° C., and an external stripping rate of about 5% to about 20%.

The parameters above may be combined and varied in any useful configuration to achieve a desired product.

In an exemplary embodiment of the present invention, hop solids from any hop variety are dispersed in water to form a slurry and processed via SCC technology to afford an aqueous composition comprising hop flavor and aroma constituents that can be used to impart hop flavor and aroma to beverages at various levels.

In an exemplary embodiment of the present invention, hop solids, e.g., from the hop varieties Mosaic®, Citra®, or Ekuanot® are dispersed in water to form a slurry and subsequently processed via SCC technology to afford aqueous compositions comprising hop flavor and aroma constituents that can be used to impart hop flavor and aroma to beverages at various levels.

In various embodiments of the present invention, T-90 hop pellets from any hop variety are dispersed in water to form a slurry and processed via SCC technology to afford an aqueous composition comprising hop flavor and aroma constituents that is characterized as being "true-to-type", wherein the sensory characteristics closely resemble those traditionally associated with the input hop variety. These aqueous compositions can be used to impart hop flavor and aroma to beverages at any level.

In an exemplary embodiment of the present invention, the aqueous compositions comprising hop flavor and aroma constituents are characterized as having high levels of flavor-active components such as hop esters, ketones, and oxides (sesquiterpene oxides, and epoxides) relative to myrcene and sesquiterpenes. In an exemplary embodiment, the characterization is via a sensory panel.

In various embodiments, the hop essence of the invention comprises from about 4% to about 10% myrcene, e.g., from about 5% to about 9%, e.g., from about 6% to about 8%. An exemplary product of the invention comprises about 7% myrcene.

In various embodiments, the hop essence of the invention comprises from about 25% to about 60% esters/ketones, e.g., from about 30% to about 60%, e.g., from about 35% to about 50%. An exemplary product of the invention comprises about 42% esters/ketones.

In various embodiments, the hop essence of the invention comprises a low level of linalool, e.g., from about 0.5% to about 1.5%. An exemplary hop essence of the invention comprises about 0.7% linalool.

In some embodiments, the hop essence of the invention comprises from about 20% to about 50% sesquiterpene oxides, e.g., from about 25% to about 40%, e.g., from about 30% to about 35%. An exemplary hop essence of the invention comprises about 3% sesquiterpene oxides.

In exemplary embodiments, the hop essence of the invention comprises from about 10% to about 20% sesquiterpenes. In an exemplary embodiment, a hop essence of the invention comprises about 15% sesquiterpenes.

In a more preferred embodiment of the present invention, the aqueous compositions comprising hop flavor and aroma constituents are characterized as having a ratio of hop esters and ketones to myrcene of about 4:1 to about 8:1, e.g., about 5:1 to about 7:1. In an exemplary embodiment, the hop essence of the invention is characterized by a ratio of esters/ketones:myrcene of about 6.0.

In various embodiments, the ratio of sesquiterpene oxides to myrcene is about 2:1 to about 6:1, e.g., about 3:1 to about 5:1. An exemplary product of the invention is characterized by a ratio of these components of about 4.6.

Table 1 provides a comparison of the relative percent of exemplary components in the hop essence of the invention with various commercially available hop sources and extracts. Data is acquired by GC-MS.

TABLE 1

| Sample | Myrcene | Linalool | Esters/Ketones | Sesquiterpenes | Sesquiterpene Oxides |
|---|---|---|---|---|---|
| Hop Essence | 7 | 0.7 | 42 | 15 | 32 |
| Oil Rich CO$_2$ Extract of Hops | 33 | 3 | 12 | 43 | 3 |
| Hop Pellets | 23 | 2 | 16 | 48 | 4 |
| CO$_2$ Hop Extract | 60 | 0 | 22 | 7 | 5 |
| Distilled Hop Oil Formulation | 3 | 3 | 8 | 1 | 65 |

Table 2 provides a comparison of the ratios of exemplary Esters/Ketones:Myrcene and of exemplary hop oxides:Myrcene in the hop essence of the invention and in exemplary commercially available sources of hops and hop essences

TABLE 2

| Sample | Esters/Ketones to Myrcene | Oxides to Myrcene |
|---|---|---|
| Hop Essence | 6.0 | 4.6 |
| Oil Rich CO$_2$ Extract of Hops | 0.4 | 0.1 |
| Hop Pellets | 0.7 | 0.2 |
| CO$_2$ Hop Extract | 0.4 | 0.1 |
| Distilled Hop Oil Formulation | 2.7 | 21.7 |

In an exemplary embodiment, the hop essence of the invention is essentially clear and does not change substantially the appearance to a formulation to which it is added. In various embodiments, the hop essence is in a form other than a paste. In various embodiments, the hop essence is a readily pumpable fluid that can be incorporated into the manufacture of a beverage or other product in which a hop flavor is desirable. In an exemplary embodiment, the hop essence is able to be added to the manufacturing stream without the need for a carrier, e.g., a non-aqueous carrier. In various embodiments, the hop essence of the invention is sufficiently soluble in water that an aqueous solution of the hop essence can be introduced into the manufacturing stream. In an exemplary embodiment, the hop essence can be introduced into the manufacturing stream without the use of organic solvents, e.g., propylene glycol.

In various embodiments, the hop essence of the invention is determined to be substantially "true to type" with respect to the hops from which it was derived in a sensory panel.

In various embodiments of the present invention, the aqueous output from SCC processing of any of the foregoing hop solids inputs is separated and isolated as a steam-stripped condensate, generally referred to as an aqueous "essence", and as an aqueous slurry "concentrate" that is generated from the slurry output via separation of hop solids and optional concentration by partial removal of water in an evaporator.

In various embodiment of the present invention, a natural or hop-derived agent is added to the aqueous essence to promote product homogeneity.

In a preferred embodiment of the present invention, an aqueous essence output from SCC processing of hop solids is combined with an aqueous concentrate output from SCC processing, in any ratio, to afford aqueous compositions comprising hop flavor and aroma constituents that can be used to impart hop flavor and aroma to beverages at any level.

In one embodiment of the present invention, the aqueous compositions comprising hop flavor and aroma constituents are added at any point in the brewing process. The resulting beer is characterized as having significantly enhanced hop flavor and aroma.

In a preferred embodiment of the present invention, the aqueous compositions comprising hop flavor and aroma constituents are added on the "cold side" of the brewing process, during or after fermentation. The resulting beer is characterized as having significantly enhanced hop flavor and aroma.

In an exemplary embodiment of the present invention, the aqueous compositions comprising hop flavor and aroma constituents are added during the manufacture of ciders, meads, or other fermented beverages, as well as other alcoholic and non-alcoholic beverages such as seltzers, flavored waters, and teas. The resulting beverage is characterized as having significantly enhanced hop flavor and aroma.

EXAMPLES

The following examples illustrate the invention without limiting its scope.

Example 1—Aqueous Hop Essence from Mosaic® T-90 Pellets

To a feed tank equipped with a mechanical stirring apparatus was added 100 L of water. Mosaic® variety T-90 hop pellets (7.5 kg) were subsequently added to the water through a milling device, and the resulting mixture was stirred to afford a 7% (by mass) slurry of Mosaic® hop solids. Additional Mosaic® T-90 hop pellets were added through the milling apparatus at a rate of 2.3 kg every 5 minutes while water was constantly added at a rate of 370 L per hour, thus producing a continuous 7% slurry ratio of feed material for processing by Spinning Cone Column (SCC) to afford an aqueous essence of Mosaic® hops. SCC operating parameters, including temperatures, flow rates, and system pressure were adjusted to produce an aqueous essence composition comprising hop flavor and aroma constituents. The resulting aqueous essence product was characterized by a pronounced hop flavor and aroma that was particularly strong in desirable hop fruity and floral character. The output is classified as "true-to-type" in that the sensory characteristics of the aqueous essence closely resemble those traditionally associated with the input Mosaic® hop variety.

Example 2—Aqueous Hop Essence from Mosaic® T-45 Pellets

To a feed tank equipped with a mechanical stirring apparatus was added 100 L of water. Mosaic® variety T-45 hop pellets (5.0 kg) were subsequently added to the water through a milling device, and the resulting mixture was stirred to afford a 5% (by mass) slurry of Mosaic® hop solids. Additional Mosaic® T-45 hop pellets were added through the milling apparatus at a rate of 1.5 kg every 5 minutes while water was constantly added at a rate of 370 L per hour, thus producing a continuous 5% slurry ratio of feed material for processing by Spinning Cone Column (SCC) to afford an aqueous essence of Mosaic® hops. SCC operating parameters, including temperatures, flow rates, and system pressure were adjusted to produce an aqueous essence composition comprising hop flavor and aroma constituents. The resulting aqueous essence product was characterized by a pronounced hop flavor and aroma that was particularly strong in desirable hop fruity and floral character. The output is classified as "true-to-type" in that the sensory characteristics of the aqueous essence closely resemble those traditionally associated with the input Mosaic® hop variety.

Example 3—Aqueous Hop Essence from "Spent" Hop Byproduct Solids after Supercritical $CO_2$ Extraction of Mosaic® Hop Pellets To a feed tank equipped with a mechanical stirring apparatus was added 100 L of water. Mosaic® variety spent hop solids after $CO_2$ extraction (5.0 kg) were subsequently added to the water through a milling device, and the resulting mixture was stirred to afford a 5% (by mass) slurry of Mosaic® hop solids. Additional Mosaic® variety spent hop solids were added through the milling apparatus at a rate of 1.5 kg every 5 minutes while water was constantly added at a rate of 370 L per hour, thus producing a continuous 5% slurry ratio of feed material for processing by Spinning Cone Column (SCC) to afford an aqueous essence of Mosaic® hops. SCC operating parameters, including temperatures, flow rates, and system pressure were adjusted to produce an aqueous essence composition comprising hop flavor and aroma constituents. The resulting aqueous essence product was characterized by a distinct hop flavor and aroma.

Example 4—Aqueous Hop Essence from Citra® T-90 Pellets

To a feed tank equipped with a mechanical stirring apparatus was added 220 L of water. Citra® variety T-90 hop pellets (18 kg) were subsequently added to the water, and the resulting mixture was stirred to afford an approximately 7.5% (by mass) slurry of Citra® hop solids. The slurry of hop solids was processed by Spinning Cone Column (SCC) to afford an aqueous essence of Citra® hops. SCC operating parameters, including temperatures, flow rates, and system pressure were adjusted to produce an aqueous essence composition comprising hop flavor and aroma constituents. The resulting aqueous essence product was characterized by a pronounced hop flavor and aroma that was particularly strong in desirable hop citrus character. The output is classified as "true-to-type" in that the sensory characteristics of the aqueous essence closely resemble those traditionally associated with the input Citra® hop variety.

Example 5—Aqueous Hop Essence from Hop Byproduct Solids after Production of T-45 Citra® Hop Pellets To a feed tank equipped with a mechanical stirring apparatus was added 100 L of water. Citra® variety hop solids, remaining after production of T-45 hop pellets (5.0 kg), were subsequently added to the water through a milling device, and the resulting mixture was stirred to afford a 5% (by mass) slurry of Citra® hop solids. Additional Citra® variety spent hop solids were added through the milling apparatus at a rate of 1.5 kg every 5 minutes while water was constantly added at a rate of 370 L per hour, thus producing a continuous 5% slurry ratio of feed material for processing by Spinning Cone Column (SCC) to afford an aqueous essence of Citra® hops. SCC operating parameters, including temperatures, flow rates, and system pressure were adjusted to produce an aqueous essence composition comprising hop flavor and aroma constituents. The resulting aqueous essence product was characterized by a distinct hop flavor and aroma.

Example 6—Aqueous Hop Essence from T-90 Hop Pellets

To a feed tank equipped with a mechanical stirring apparatus was added 220 L of water. T-90 hop pellets (18 kg)

were subsequently added to the water, and the resulting mixture was stirred to afford an approximately 7.5% (by mass) slurry of hop solids. The slurry of hop solids was processed by Spinning Cone Column (SCC) to afford an aqueous essence of hops. SCC operating parameters, including temperatures, flow rates, and system pressure are adjusted to produce an aqueous essence composition comprising hop flavor and aroma constituents. The resulting aqueous essence product was characterized by a pronounced hop flavor and aroma that is particularly strong in desirable attributes. The output is classified as "true-to-type" in that the sensory characteristics of the aqueous essence closely resemble those traditionally associated with the input hop variety.

Example 7—Blending of Aqueous Hop Essence and Aqueous Hop Concentrate

To an aqueous essence generated from hop solids via SCC processing is added an aqueous concentrate generated from hop solids via SCC processing to afford an aqueous hop composition comprising hop flavor and aroma constituents. The amount of aqueous concentrate added to the aqueous essence is adjusted from 0% to 100% in order to achieve desired flavor and aroma characteristics.

Example 8—Beer with Aqueous Hop Essence Composition from Citra® Variety Hop

A wort was generated from malted barleys at a gravity of 15.7° P to afford a beer with 6.5% ABV (alcohol by volume) at the end of fermentation. A flavor-neutral hop acid product was used during the boiling stage of the brewing process to provide bitterness in the final beer. After whirlpool separation of insoluble species and chilling, the wort was transferred into a fermentation vessel. Fermentation was subsequently initiated by the addition of Wyeast 1056 yeast. When the beer had reached final gravity and fermentation had ceased, a suitable amount (approximately 1% by volume) of the natural aqueous essence from Citra® variety hops was added. The resulting beer was characterized by a pronounced hop flavor and aroma that was distinct in the desirable attributes typically associated with Citra® hops.

Example 9—Alcoholic Seltzer with Aqueous Hop Essence Composition from Citra® Variety Hop An alcoholic seltzer containing 5% ABV was produced by the fermentation of an aqueous solution of fermentable sugars following standard practice, including the addition of yeast nutrients. After fermentation had ceased, the yeast was removed and the sweetness of the seltzer was adjusted using a standardized amount of aqueous sugar solution. A suitable amount (approximately 1.7% by volume) of the natural aqueous essence from Citra® variety hops was subsequently added. The resulting seltzer was characterized by a pronounced hop flavor and aroma that was distinct in the desirable attributes typically associated with Citra® hops.

Example 10—Aqueous Hop Composition in the Manufacture of Beer or Other Fermented Beverages To a finished fermented beverage generated via traditional processes known to those skilled in the art, such as a beer or seltzer, was added a suitable amount of a natural aqueous composition comprising hop flavor and aroma constituents. The resulting beverage was characterized by a pronounced hop flavor and aroma that is distinct in desirable attributes.

Example 11—Addition of Aqueous Hop Composition to Other Beverages

To beverages such as seltzers, teas, and waters produced via standard processes known to those skilled in the art, is added a suitable amount of a natural aqueous composition comprising hop flavor and aroma constituents. If filtering of the beverage is required, the addition of the aqueous essence is performed either before or after final filtration of the beverage via methods known to those skilled in the art. The resulting beverage is characterized by a pronounced hop flavor and aroma that is distinct in desirable attributes.

Example 12—Sensory Analysis of Aqueous Hop Compositions and Beer or Other Beverages Manufactured with Same The organoleptic properties of aqueous hop essences, aqueous hop concentrates, blends of these aqueous hop fractions, and beer or other beverages generated using aqueous compositions of the present invention are determined using quantitative, qualitative, and difference analysis via sensory methods known to those skilled in the art. An evaluation of the data and results from a trained sensory panel indicates that the use of the inventive aqueous hop compositions impacts the flavor and aroma properties of treated beverages.

The present invention is not to be limited in scope by the specific embodiments described herein. Indeed, various modifications of the invention in addition to those described herein will become apparent to those skilled in the art from the foregoing description. Such modifications are intended to fall within the scope of the appended claims. All references cited herein are incorporated by reference in their entirety for all purposes.

CITED REFERENCES

1. Briggs, D. E.; Boulton, C. A.; Brookes, P. A., Stevens, R., Brewing—Science and Practice, Woodhead Publishing, LTD: Cambridge, England, 2004.
2. Kunze, W., Technology Brewing and Malting—$5^{th}$ English Edition, VLB Publishers: Berlin, 2014.
3. Bamforth, C., Beer: Tap into the Art and Science of Brewing, $3^{rd}$ Edition, Oxford University Press, Inc.: New York, 2009.
4. Ting, P.; Ryder, D. S., "The Bitter Twisted Truth of the Hop: 50 Years of Hop Chemistry", J. Am. Soc. Brew. Chem., 2017, 75(3), 161-180.
5. Moir, M., "Hops—A Millennium Review", J. Am. Soc. Brew. Chem., 2000, 58(4), 131-146.
6. Sharp, D. C.; Vollmer, D. M.; Qian, Y.; Shellhammer, T. H., "Examination of Glycoside Hydrolysis Methods for the Determination of Terpenyl Glycoside Contents of Different Hop Cultivars", J. Am. Soc. Brew. Chem., 2017, 75(2), 101-108.
7. Sharp, D. C.; Qian, Y.; Shellhammer, G.; Shellhammer, T. H., "Contributions of Select Hopping Regimes to the Terpenoid Content and Hop Aroma Profile of Ale and Lager Beers", J. Am. Soc. Brew. Chem., 2017, 75(2), 93-100.
8. Vollmer, D. M.; Shellhammer, T. H., "Influence of Hop Oil Content and Composition on Hop Aroma Intensity in Dry-Hopped Beer", J. Am. Soc. Brew. Chem., 2016, 74(4), 242-249.

9. Van Opstaele, F.; De Rouck, G.; De Clippeleer, J.; Aerts, G.; De Cooman, L., "Analytical and Sensory Assessment of Hoppy Aroma and Bitterness of Conventionally Hopped and Advanced Hopped Pilsner Beers", *J. Inst. Brew.*, 2010, 116(4), 445-458.

What is claimed is:

1. A method of preparing a water-soluble hop essence formulation, the formulation comprising:
   (a) a myrcene content of from about 4% to about 10%;
   (b) an esters/ketones content of from about 25% to about 60%;
   (c) a sesquiterpenes content of from about 10% to about 20%; and
   (d) a sesquiterpene oxides content of from about 20% to about 50%,
the method comprising:
   (1) processing with a spinning cone column system an aqueous slurry comprising from about 2% to about 20% of hop solids in water through a spinning cone column and isolating the formulation, wherein the processing comprises a member selected from:
      (i) a system temperature from about 40° C. to about 80° C.;
      (ii) an offset temperature ($T_{SCCFeed}-T_{SCC}$) from about −50° C. to about 25° C.;
      (iii) an external stripping rate of from about 2% to about 30%; and a combination thereof; and
   (2) collecting the water-soluble hop essence formulation.

2. The method of claim 1, wherein the myrcene content of the formulation is from about 6% to about 8%.

3. The method according to claim 1, wherein the esters/ketones content of the formulation is from about 35% to about 50%.

4. The method according to claim 1, wherein the sesquiterpene content of the formulation is from about 10% to about 20%.

5. The method according to claim 1, wherein the sesquiterpene oxides content of the formulation is from about 25% to about 40%.

6. The method according to claim 1, wherein the formulation has a ratio of esters/ketones to myrcene of about 4:1.

7. The method of claim 1, wherein the formulation has a ratio of esters/ketones to myrcene of about 8:1.

8. The method according to claim 1, wherein the formulation has a ratio of sesquiterpene oxides to myrcene of about 2:1.

9. The method according to claim 1, wherein the formulation has a ratio of sesquiterpene oxides to myrcene of about 6:1.

10. The method according to claim 1, wherein the formulation is a clear, colorless aqueous solution.

11. The method according to claim 1, wherein the formulation is clear and colorless.

12. The method according to claim 1, wherein hop oil component concentration is lower than non-oil hop component concentration.

13. The method according to claim 1, wherein the formulation, devoid of organic solvents, is suitable for introduction into a beverage manufacturing stream.

14. The method according to claim 1, wherein the beverage is selected from a beer, a flavored water and a selzer.

15. The method according to claim 11, wherein the formulation is suitable for introduction on a brewing process cold side.

16. The method according to claim 1, wherein the formulation is true-to-type as determined by a sensory panel.

17. A method of preparing a water-soluble hop essence formulation comprising myrcene, esters/ketones, sesquiterpenes and sesquiterpene oxides, the method comprising:
   (1) processing with a spinning cone column system an aqueous slurry comprising from about 2% to about 20% of hop solids in water through a spinning cone column and isolating the formulation, wherein the processing comprises:
      (i) a system temperature from about 40° C. to about 80° C.;
      (ii) an offset temperature ($T_{SCCFeed}-T_{SCC}$) from about −50° C. to about 25° C.; and
      (iii) an external stripping rate of from about 2% to about 30%; and
   (2) collecting the water-soluble hop essence formulation.

18. The method of claim 17, further comprising, prior to (a) preparing the slurry by milling the hop solids with water.

19. The method of claim 17 further comprising continuously adding the slurry to the spinning cone column system during the processing.

20. The method of claim 17, wherein the system temperature is from about 45° C. to about 65° C.

21. The method according to claim 17, wherein the formulation comprises a member selected from:
   (a) a myrcene content of from about 4% to about 10%;
   (b) an esters/ketones content of from about 25% to about 60%;
   (c) a sesquiterpenes content of from about 10% to about 20%;
   (d) a sesquiterpene oxides content of from about 20% to about 50%; and a combination thereof.

22. The method of claim 17, wherein the formulation has a myrcene content of from about 6% to about 8%.

23. The method according to claim 17, wherein the formulation has an esters/ketones content of from about 35% to about 50%.

24. The method according to claim 17, wherein the formulation has a sesquiterpene content of from about 10% to about 20%.

25. The method according to claim 17, wherein the formulation has a sesquiterpene oxides content of from about 25% to about 40%.

26. The method according to claim 17, wherein the formulation has a ratio of esters/ketones to myrcene of about 4:1.

27. The method of claim 17, wherein the formulation has a ratio of esters/ketones to myrcene of about 8:1.

28. The method according to claim 17, wherein the formulation has a ratio of sesquiterpene oxides to myrcene of about 2:1.

29. The method according to claim 17, wherein the formulation has a ratio of sesquiterpene oxides to myrcene of about 6:1.

30. The method according to claim 17, wherein the formulation is a clear, colorless aqueous solution.

31. The method according to claim 17, wherein the formulation is clear and colorless.

32. The method according to claim 17, wherein hop oil component concentration is lower than non-oil hop component concentration.

33. The method according to claim 17, wherein the formulation, devoid of organic solvents, is suitable for introduction into a beverage manufacturing stream.

34. The method according to-claim 17, wherein the beverage is selected from a beer, a flavored water and a selzer.

35. The method according to claim 32, wherein the formulation is suitable for introduction on a brewing process cold side.

36. The method according to claim 17, wherein the formulation is true-to-type as determined by a sensory panel.

* * * * *